US008737252B2

(12) United States Patent
Davis

(10) Patent No.: US 8,737,252 B2
(45) Date of Patent: May 27, 2014

(54) METHOD AND APPARATUS FOR MULTICARRIER COVERAGE DIVERSITY

(75) Inventor: Roy Howard Davis, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 95 days.

(21) Appl. No.: 13/432,377

(22) Filed: Mar. 28, 2012

(65) Prior Publication Data
US 2013/0258868 A1    Oct. 3, 2013

(51) Int. Cl.
*H04W 72/08* (2009.01)

(52) U.S. Cl.
USPC ............................ 370/252; 370/343; 370/315

(58) Field of Classification Search
USPC .......................................................... 370/252
See application file for complete search history.

(56) References Cited

U.S. PATENT DOCUMENTS

| | | | | |
|---|---|---|---|---|
| 7,120,395 | B2 * | 10/2006 | Tong et al. | 455/101 |
| 7,864,099 | B2 * | 1/2011 | Colburn et al. | 342/70 |
| 8,064,533 | B2 * | 11/2011 | Rofougaran | 375/267 |
| 8,213,543 | B2 * | 7/2012 | Dubuc et al. | 375/316 |
| 8,269,668 | B2 * | 9/2012 | Barker et al. | 342/372 |
| 8,305,986 | B2 * | 11/2012 | Zhang et al. | 370/329 |
| 8,331,342 | B2 * | 12/2012 | Khan et al. | 370/344 |
| 2005/0148370 | A1 * | 7/2005 | Moldoveanu et al. | 455/562.1 |
| 2005/0207367 | A1 * | 9/2005 | Onggosanusi et al. | 370/315 |
| 2007/0135170 | A1 * | 6/2007 | Khan et al. | 455/562.1 |
| 2007/0275664 | A1 * | 11/2007 | Uhl | 455/67.11 |
| 2008/0298450 | A1 | 12/2008 | Zhang et al. | |
| 2009/0066595 | A1 | 3/2009 | Barker et al. | |
| 2011/0009149 | A1 * | 1/2011 | Chen et al. | 455/517 |
| 2011/0199956 | A1 | 8/2011 | Wu | |
| 2011/0286391 | A1 * | 11/2011 | Chen et al. | 370/328 |
| 2011/0310877 | A1 * | 12/2011 | Wu et al. | 370/343 |
| 2013/0034063 | A1 * | 2/2013 | Ballas | 370/329 |
| 2013/0039303 | A1 * | 2/2013 | Stadelmeier et al. | 370/329 |
| 2013/0064204 | A1 | 3/2013 | Sun et al. | |

FOREIGN PATENT DOCUMENTS

WO    2011035808 A1    3/2011

OTHER PUBLICATIONS

Awada, et al., "Optimizing the Radio Network Parameters of the Long Term Evolution System Using Taguchi's Method" IEEE Transactions on Vehicular Technology, Oct. 2011, pp. 3825-3839, Vol. 60, No. 8.
Dahlman E., et al., "Scheduling, Link Adaptation, and Hybrid ARQ (Chapter 5)" In : "4G LTE/LTE—Advanced for Mobile Broadband", Mar. 29, 2011, Academic Press in Elsevier, XP055075330, pp. 79-93, p. 87.
International Search Report and Written Opinion—PCT/US2013/034461—ISA/EPO—Aug. 22, 2013.

* cited by examiner

*Primary Examiner* — Ian N Moore
*Assistant Examiner* — Lakeram Jangbahadur
(74) *Attorney, Agent, or Firm* — Darren M. Simon

(57) ABSTRACT

Methods and apparatus are described for overcoming interference in a multicarrier communication system by applying different antenna configurations to each carrier in a multicarrier base station based on channel conditions specific to the carrier. Each carrier may be assigned to a different antenna element configuration, each configuration providing a different coverage area. Different portions of a data stream may be transmitted simultaneously via each carrier, the amount of data in each portion of the data stream being defined based on the channel conditions.

16 Claims, 13 Drawing Sheets

METHOD AND APPARATUS FOR MULTICARRIER COVERAGE DIVERSITY

BACKGROUND

1. Field

Aspects of the present disclosure relate generally to wireless communication systems, and more particularly, to reducing interference in a multicarrier system.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications.

SUMMARY

Methods and apparatus are described for overcoming interference in a multicarrier communication system by applying different antenna configurations to each carrier in a multicarrier base station based on channel conditions specific to the carrier. Each carrier may be assigned to a different antenna element configuration, each configuration providing a different coverage area. Different portions of a data stream may be transmitted simultaneously via each carrier, the amount of data in each portion of the data stream being defined based on the channel conditions.

In one aspect, the disclosure provides a method for wireless communication. The method may include determining a channel condition associated with each of a first carrier associated with a base station (BS) and a second carrier associated with the BS. The method may also include assigning the first carrier to a first antenna element configuration and assigning the second carrier to a second antenna element configuration. The first antenna element configuration and the second antenna element configuration may provide different coverage areas. The method may also include transmitting, via the first carrier, a first portion of a data stream, and simultaneously transmitting a second portion of the data stream via the second carrier. The BS may determine the amount of data in the first portion of the data stream and the second portion of the data stream based on the determined channel conditions for each carrier These and other aspects of the invention will become more fully understood upon a review of the detailed description, which follows.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Figure 1:
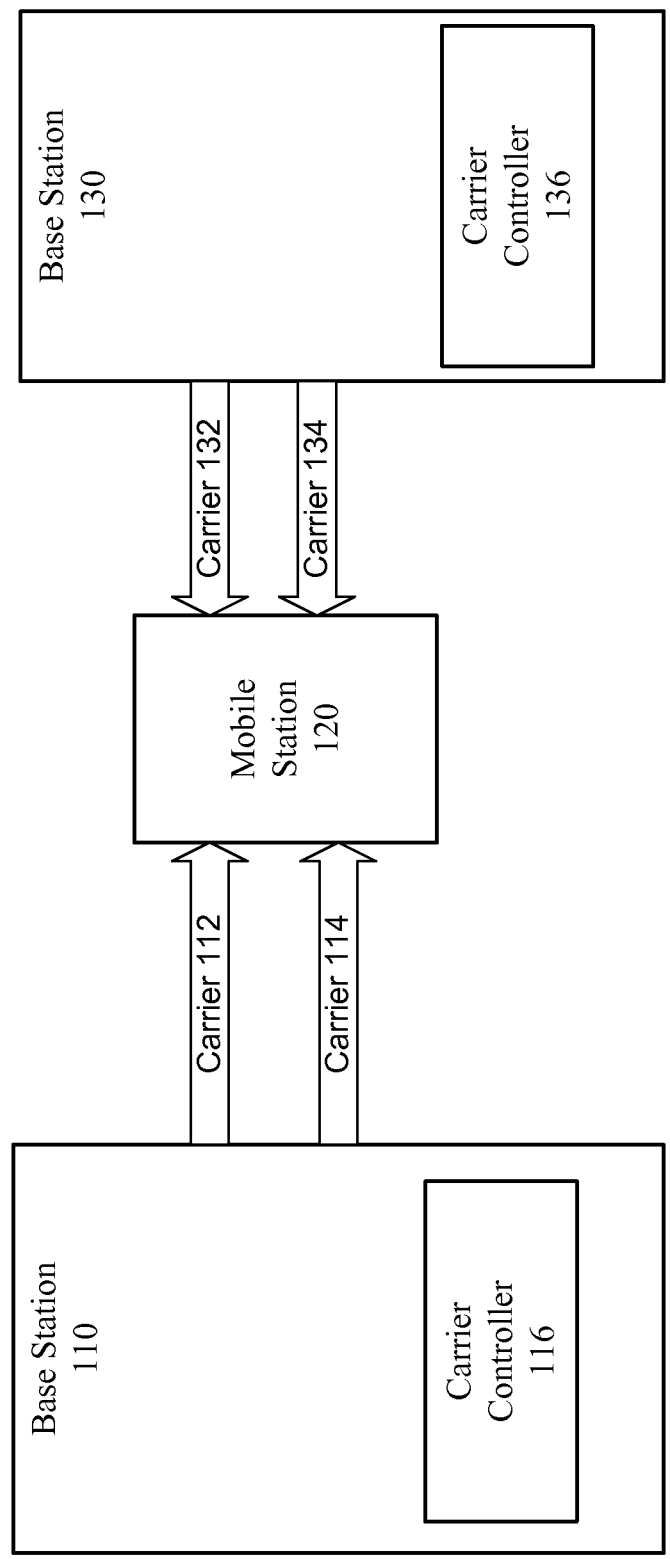
FIG. 1 is a block diagram of an example communication system.

FIG. 1 depicts an exemplary communications system 100 for facilitating the management of cells in a multicarrier system, in accordance with various aspects of this disclosure. System 100 may include a first base station 110 configured to communicate with one or more mobile stations, such as mobile station 120. BS 110 may be associated with a first coverage area (not shown). The first coverage area may be, for example, a macro cell coverage area, a pico cell coverage area, etc. A second base station, BS 130, associated with a second coverage area may also be configured to communicate with MS 120. Like the first coverage area, the second coverage area may be a macro cell coverage area, a pico cell coverage area, etc. In some aspects, the first coverage area and the second coverage area may be partially overlapping or may share a common boundary. As such, interference from the BS not in use by MS 120 may degrade the signal received at MS 110.

In accordance with some aspects, BS 110 may be a multicarrier BS capable of communicating using a plurality of antennas. For example, BS 110 may communicate via a first carrier 112 and a second carrier 114. BS 110 may be configured to transmit a data stream to MS 120 simultaneously via the first carrier 112 and the second carrier 114. More particularly, BS 110 may be configured to transmit a first portion of the data stream on the first carrier 112 and a second, different portion of the data stream on the second carrier 114. Carrier controller 116 may be configured to determine an amount of data to transmit via each carrier. For example, first carrier 112 may be an anchor carrier assigned for control channels and some data channels, while second carrier 114 may be assigned as a dedicated carrier for data channels. A data stream may be split between the two carriers based on the channel conditions. In some aspects, BS 130 may also be a multi-carrier base station, and may communicate via a first carrier 132, and second carrier 134, and a carrier controller 136. BS 130 may operate in a similar manner to BS 110. Carrier selections for each base station in a network, such as BS 110 and BS 130, may be coordinated by a central node (e.g., a base station scheduler/controller or other controller) serving the network.

Figure 2:
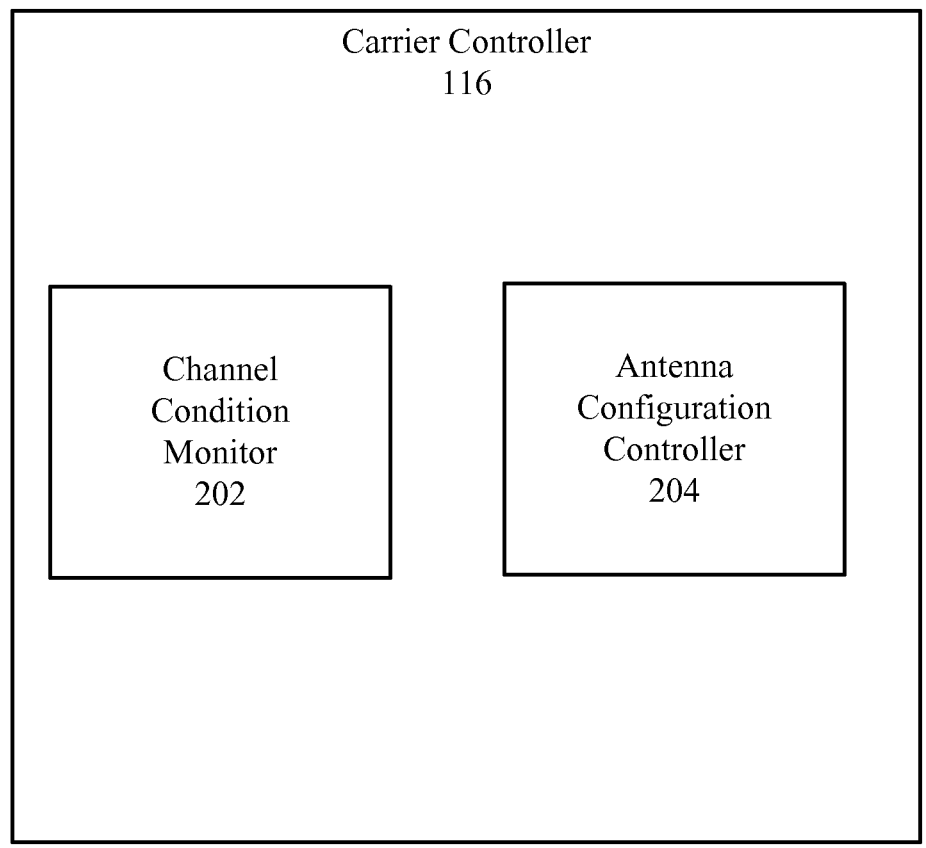
FIG. 2 is a block diagram conceptually illustrating a carrier controller.

Turing now to FIG. 2, carrier controller 116 is shown in greater detail. In accordance with some aspects, the amount of data transmitted via a carrier is determined based on the channel conditions associated with the carrier at a given time. Channel condition monitor 202 may be configured to monitor the channel conditions associated with each carrier. As described above, BS 110 may use a plurality of antennas to transmit data to, for example, MS 120. Antenna configuration controller 204 may be configured to configure the antennas/antenna elements to transmit on each carrier. For example, a high gain antenna may be configured for use in transmitting on a first carrier while a low gain antenna may be configured for use in transmitting on a second carrier. In other aspects, two high gain antennas having different orientations (e.g., one vertical orientation and one horizontal orientation) may be used, antennas pointed in different directions, a selection of antenna elements from an integrated antenna, etc.

Figure 3:
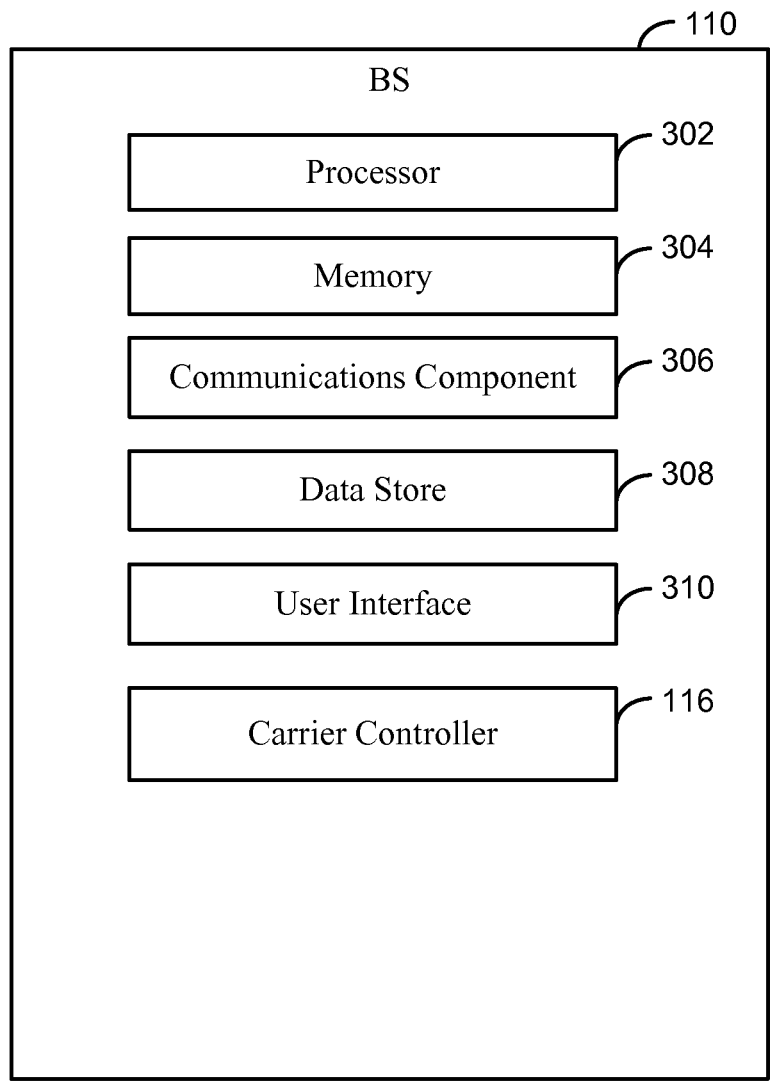
FIG. 3 is a block diagram conceptually illustrating an example of a base station.

FIG. 3 depicts an exemplary base station, such as BS 110, in greater detail. BS 110 may include a processor 302 for carrying out processing functions associated with one or more of components and functions described herein. Processor 302 can include a single or multiple set of processors or multi-core processors. Moreover, processor 302 can be implemented as an integrated processing system and/or a distributed processing system.

BS 110 further includes a memory 304, such as for storing data used herein and/or local versions of applications being executed by processor 302. Memory 304 can include any type of memory usable by a computer, such as random access memory (RAM), read only memory (ROM), tapes, magnetic discs, optical discs, volatile memory, non-volatile memory, and any combination thereof. Applications may include, for example, one or more object matching applications.

Further, BS 110 may include a communications component 306 that provides a means for establishing and maintaining communications with one or more parties utilizing hardware, software, and services as described herein. Communications component 306 may carry communications between components on BS 110, as well as between BS 110 and external devices, such as devices located across a communications network and/or devices serially or locally connected to BS 110. For example, communications component 306 may include one or more buses, and may further include transmit chain components and receive chain components associated with a transmitter and receiver, respectively, operable for interfacing with external devices such as mobile station 120.

Additionally, BS 110 may further include a data store 308, which can be any suitable combination of hardware and/or software, that provides for mass storage of information, databases, and programs employed in connection with aspects described herein. For example, data store 308 may be a data repository for applications not currently being executed by processor 302. In some aspects, data store 308 may be located within memory 304.

BS 110 may additionally include a user interface component 310 operable to receive inputs from a user of BS 110, or serving as an application programming interface (API), and may be further operable to generate outputs for presentation to the user. User interface component 310 may include one or more input devices, including but not limited to a keyboard, a number pad, a mouse, a touch-sensitive display, a navigation key, a function key, a microphone, a voice recognition component, a still camera, a video camera, an audio recorder, and/or any other mechanism capable of receiving an input, or any combination thereof. Further, user interface component 310 may include one or more output devices, including but not limited to a display, a speaker, a haptic feedback mechanism, a printer, any other mechanism capable of presenting an output, or any combination thereof BS 110 may also include carrier controller 116, described above with respect to FIGS. 1 and 2.

Figure 4:
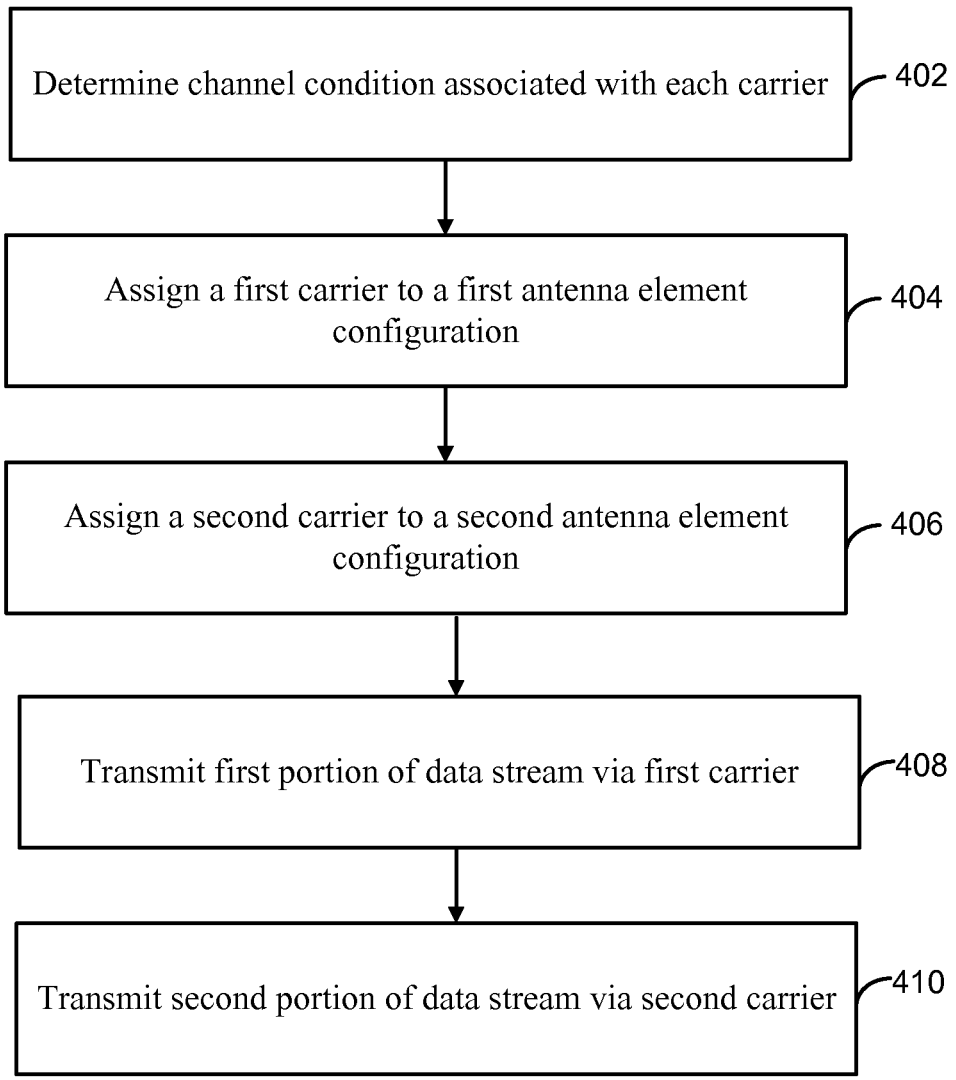
FIG. 4 is a flowchart showing an exemplary process for wireless communication.

Turning now to FIG. 4, an exemplary method 400 for wireless communication is depicted. In accordance with some aspects, method 400 may be performed by BS 110. As shown at 402, the BS may determine a channel condition associated with each of a first carrier associated with the BS and a second carrier associated with the BS. For example, a mobile station may send back to the BS channel quality indicators (CQI) that are used to determine the appropriate data and coding rates to ensure successful delivery of data on the downlink. As shown at 404, the BS may assign the first carrier to a first antenna element configuration. The BS may also assign the second carrier to a second antenna element configuration, as shown at 406. In accordance with some aspects, the first antenna element configuration and the second antenna element configuration may provide different coverage areas. The BS may then transmit, via the first carrier, a first portion of a data stream, as shown at 408, and simultaneously transmit a second portion of the data stream, as shown at 410, via the second carrier. In accordance with some aspect, the BS determines the amount of data in the first portion of the data stream and the second portion of the data stream based on the determined channel conditions for each carrier. Carriers with a low CQI may require a large amount of base station power to maintain even a slow data link. As such, a base station scheduling node may shift data to another carrier, or hold back data until channel conditions improve, for example, while serving other mobile stations having a good CQI. Different antenna patterns for each carrier provide a diversity of channel conditions increasing the opportunity to route data over the best carrier links.

Figure 5:
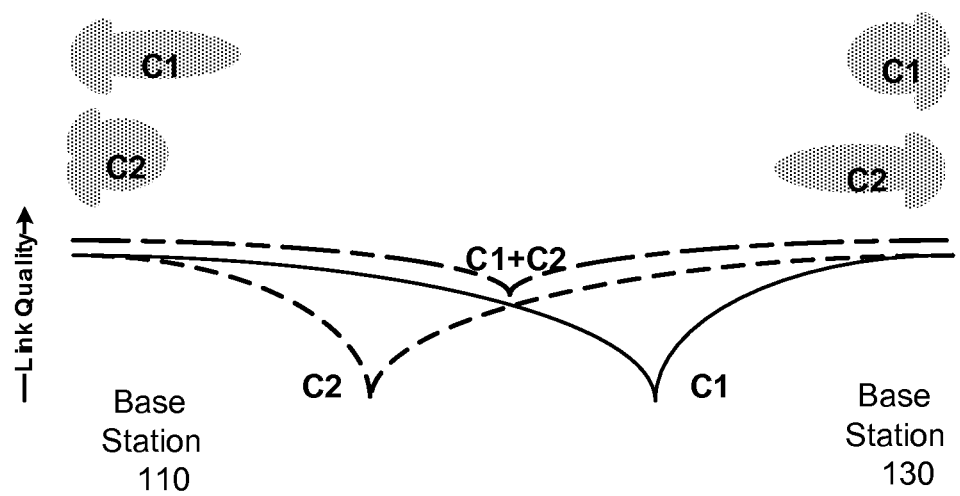
FIG. 5 is a conceptual diagram illustrating link quality improvements.

As described herein, by simultaneously transmitting data on multiple carriers via antennas with different configurations, the high interference levels at the boundaries of two base stations can be reduced. Generally, radio access networks are sized such that the traffic load is supported by the worst performing geographical area, resulting in much of the network capacity being underutilized. By improving the performance in the worst performing area, the overall apparent network capacity is improved. FIG. 5 illustrates the link quality improvements associated with this method. As shown in FIG. 5, BS 110 may transmit data over a first carrier, C1, using a first antenna configuration, and may transmit data over a second carrier, C2, using a second antenna configuration. Likewise, BS 130 may transmit data over the first carrier, C1, using a first antenna configuration and over the second carrier, C2, using a second antenna configuration. In some aspects, the antenna configuration used for C1 on BS 110 and C2 on BS 130 may be the same, while the antenna configuration used for C2 on BS 110 and C1 on BS 130 may be the same. Each carrier has a region where it is subject to intercell interference, causing the link quality to suffer. By varying the antenna configurations/coverage areas, the carriers do not have the low link quality occurring in the same area. C1 has a disadvantaged region closer to BS 130 while the disadvantaged region for C2 is closer to BS 110. Because data may be scheduled to flow over either or both of C1 and C2, the user can experience the C1+C2 performance curve that maintains throughput at a higher level in the boundary area.

Figure 6:
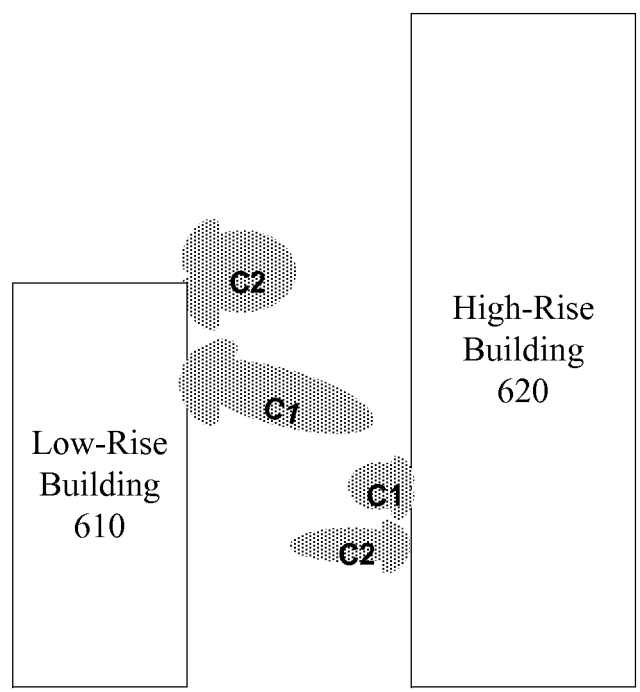
FIG. 6 is a block diagram showing an example use case.

FIG. 6 depicts an exemplary use case for implementing the apparatus and methods described herein. The use of mobile cellular devices has evolved from something typically done outside, to something that is more often used indoors. This has presented some problems in dense, urban areas where having coverage only on the street is inadequate as uses expect coverage indoors, including in high-rise buildings. In accordance with some aspects, the use of two similar antennas to provide coverage diversity may be used. As shown in FIG. 6, a low-rise building 610 may be opposite a high-rise building 620. The low-rise building 610 may be within the coverage area of a macro base station, for example, while the high-rise building 620 may be in the coverage area of a pico base station. A first antenna configuration base be used for transmitting over carrier C1 deployed at the low-rise building and a second antenna configuration may be used for transmitting over carrier C2 at the low-rise building. For example, a low gain antenna on the macro base station may provide coverage to the high-rise building 620 while high-gain antenna provides street coverage. Carrier diversity may likewise be carried out via the antennas associated with the pico base station (and high-rise building 620).

Many base station manufacturers use module designs wherein electronics are integrated with antenna modules, and different antenna patterns and power levels can be produced by stacking modules in different configurations. In accordance with some aspects, carrier diversity may be achieved by stacking antenna modules in different configurations for each carrier on a base station. Each module may contain the complete electronics to transmit and receive radio signals. A pair of antenna elements may be included on the face of each module. In some aspects, one antenna element may be angle, for example to 45 degrees while the other is angled to −45 degrees to provide cross polarization diversity.

Stacking the modules vertically may provide a vertical beam pattern that is tightly compressed. Grouping the modules into a square may provide a beam that is wide in both the horizontal and vertical directions. Stacking more modules produces more power and gain, and results in a configuration that may be suitable for a macro base station. On the other hand, using fewer modules may produce lower power and wider beam widths, which may result in a configuration suitable for a pico base station. In some aspects, some of the modules may be turned off for one or more of the carriers, resulting in a different antenna pattern. Adjustments to an antenna pattern may be performed, for example, occasionally, in response to predictable traffic patterns, or frequently in response to real-time traffic load, in accordance with some aspects.

Figure 7:
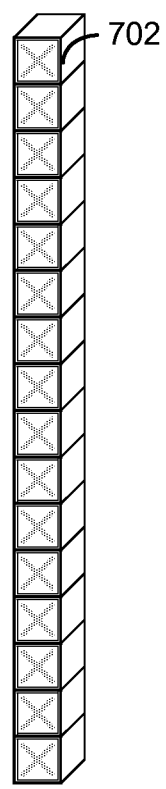
FIG. 7 depicts an example of a modular antenna configuration.

FIG. 7 shows an exemplary high power, high gain antenna/modular macro base station. In some aspects, a first carrier can be configured to use a subset of the antenna modules shown in FIG. 7, resulting in a relatively wide-beam, low gain coverage area, while a second carrier may be configured to use all of the antenna modules, resulting in a narrower-beam, high gain coverage.

Figure 8:
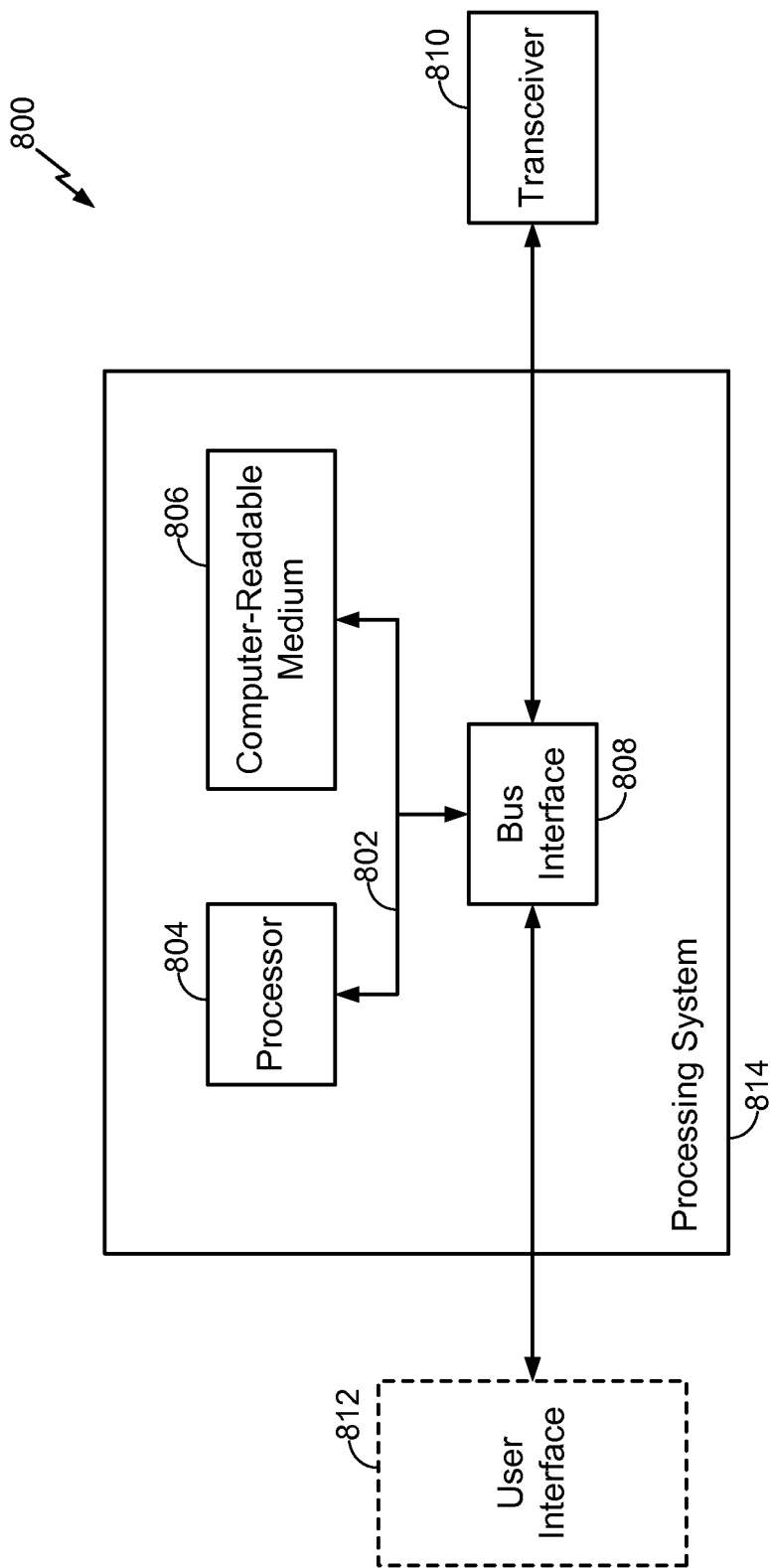
FIG. 8 is a block diagram illustrating an example of a hardware implementation for an apparatus employing a processing system.

Turning now to FIG. 8, a block diagram illustrating an example of a hardware implementation for an apparatus, such as BS 110, employing a processing system 814 is provided. In this example, the processing system 814 may be implemented with a bus architecture, represented generally by the bus 802. The bus 802 may include any number of interconnecting buses and bridges depending on the specific application of the processing system 814 and the overall design constraints. The bus 802 links together various circuits including one or more processors, represented generally by the processor 804, and computer-readable media, represented generally by the computer-readable medium 806. The bus 802 may also link various other circuits such as timing sources, peripherals, voltage regulators, and power management circuits, which are well known in the art, and therefore, will not be described any further. A bus interface 808 provides an interface between the bus 802 and a transceiver 810. The transceiver 810 provides a means for communicating with various other apparatus over a transmission medium. Depending upon the nature of the apparatus, a user interface 812 (e.g., keypad, display, speaker, microphone, joystick) may also be provided.

The processor 804 is responsible for managing the bus 802 and general processing, including the execution of software stored on the computer-readable medium 806. The software, when executed by the processor 804, causes the processing system 814 to perform the various functions described infra for any particular apparatus. For example, the computer-readable medium 806 may be configured to implement the functions of carrier controller 116. The computer-readable medium 806 may also be used for storing data that is manipulated by the processor 804 when executing software.

Figure 9:
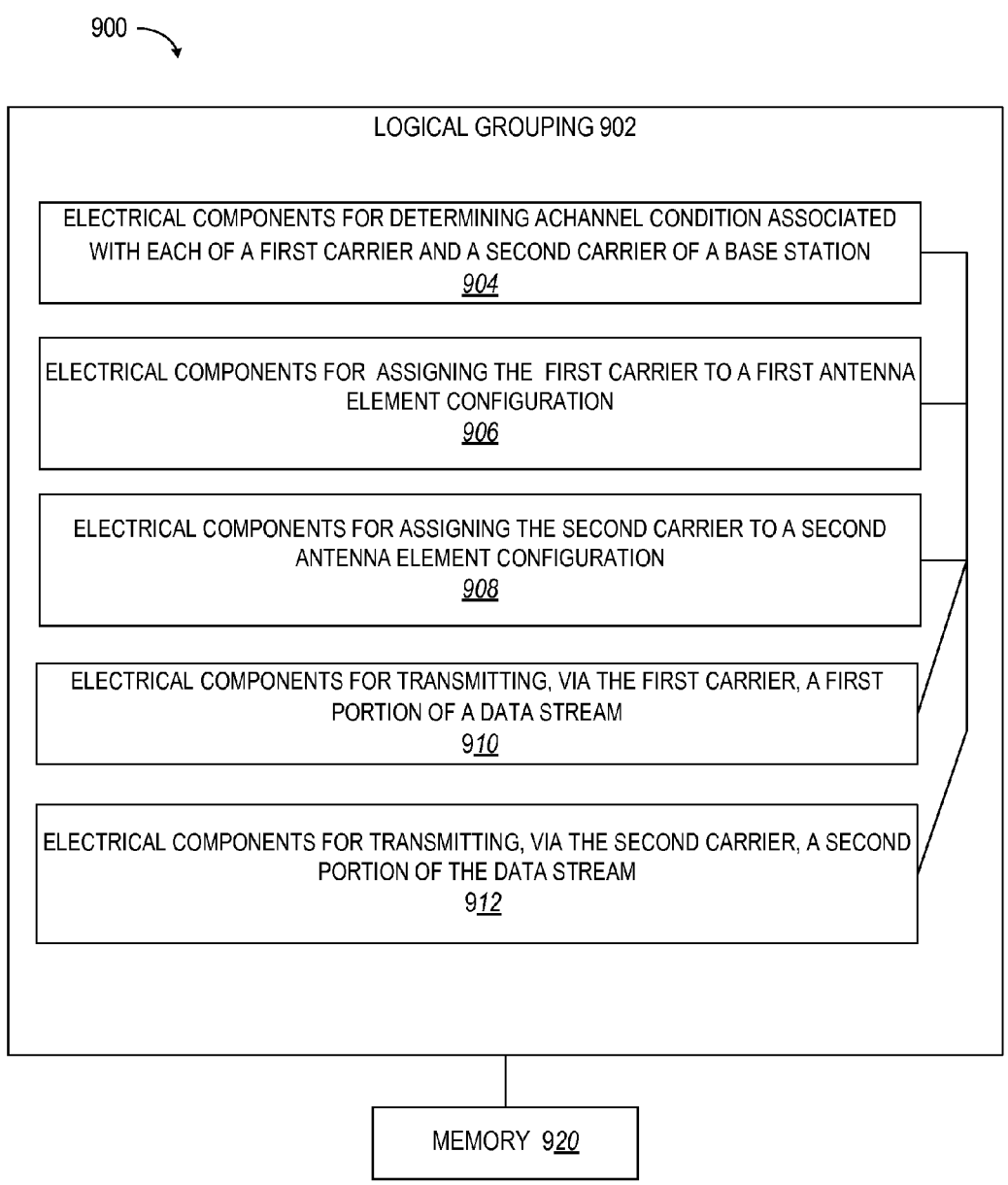
FIG. 9 is a conceptual block diagram illustrating a hardware implementation of a base station.

With reference to FIG. 9, illustrated is a system 900 for wireless communication. For example, system 900 resides at least partially within BS 110 (FIG. 1). It is to be appreciated that system 900 is represented as including functional blocks, which can be functional blocks that represent functions implemented by a computing platform, processor, software, or combination thereof (e.g., firmware). System 900 includes a logical grouping 902 of electrical components that can act in conjunction. For instance, logical grouping 902 can include an electrical component 904 for determining a channel condition associated with each of a first carrier and a second carrier of a base station. For example, component 904 may be implemented by carrier controller 116, processor 302, and/or processor 804. Moreover, logical grouping 902 can include an electrical component 906 for assigning the first carrier to a first antenna element configuration. For example, component 906 may be implemented by antenna configuration controller 204, processor 302, and/or processor 804. Logical grouping 902 may also include an electrical component 908 for assigning the second carrier to a second antenna element configuration. For example, component 908 may be implemented by antenna configuration controller 204, processor 302, and/or processor 804. Logical grouping 902 can also include an electrical component 910 for transmitting, via the first carrier, a first portion of a data stream. Electrical component 910 may be implemented, for example, by communications component 306, processor 302, and/or processor 804. In addition, logical grouping 904 can include an electrical component 912 for simultaneously transmitting, via the second carrier, a second portion of the data stream. Electrical component 912 may be implemented, for example, by communications component 306, processor 302, and/or processor 804. Additionally, system 900 can include a memory 920 that retains instructions for executing functions associated with electrical components 906-912. While shown as being external to memory 920, it is to be understood that one or more of electrical components 904-912 can exist within memory 920.

Figure 10:
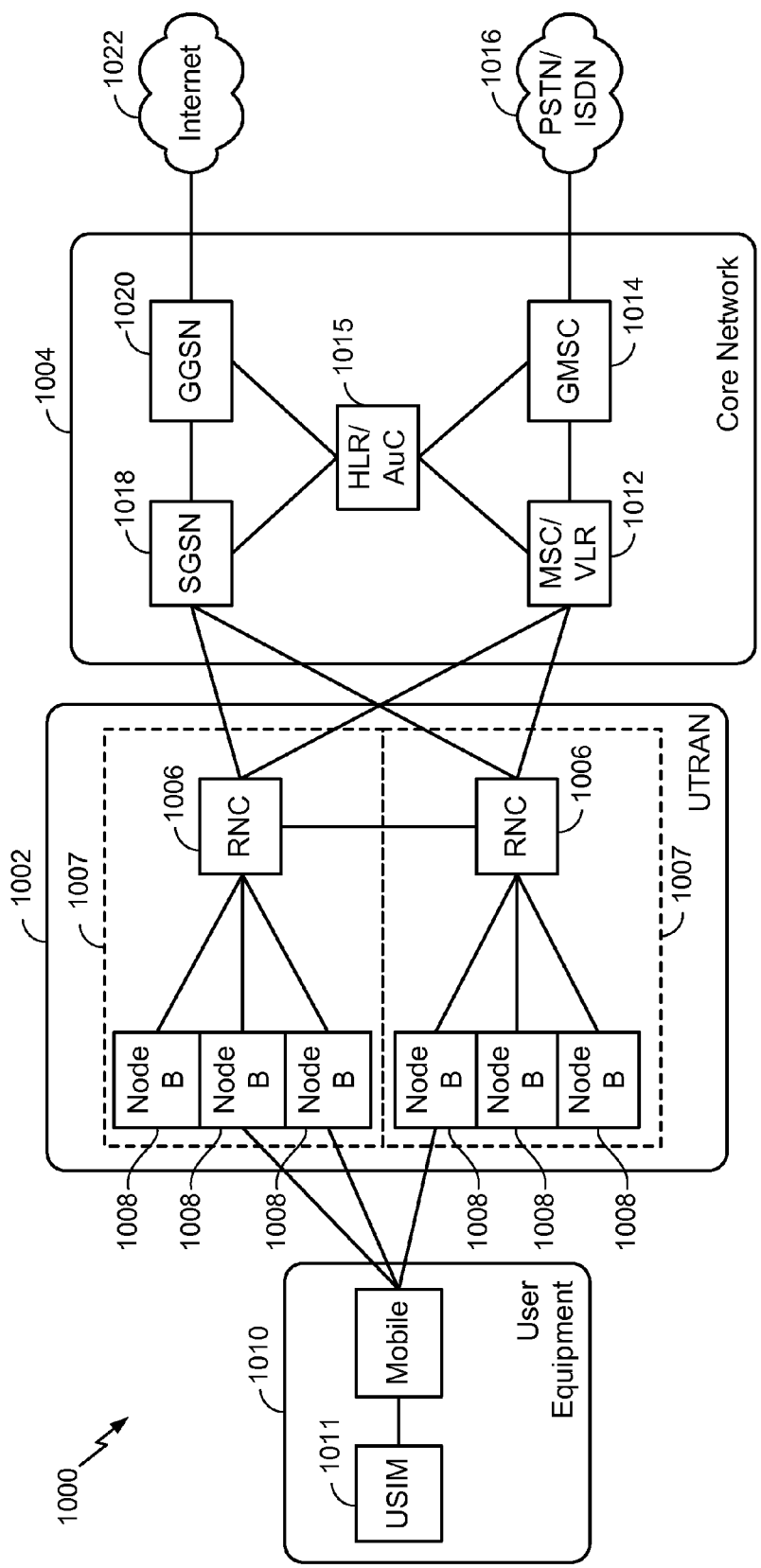
FIG. 10 is a block diagram conceptually illustrating an example of a telecommunications system.

The various concepts presented throughout this disclosure may be implemented across a broad variety of telecommunication systems, network architectures, and communication standards. By way of example and without limitation, the aspects of the present disclosure illustrated in FIG. 10 are presented with reference to a UMTS system 1000 employing a W-CDMA air interface. A UMTS network includes three interacting domains: a Core Network (CN) 1004, a UMTS Terrestrial Radio Access Network (UTRAN) 1002, and User Equipment (UE) 1010. In this example, the UTRAN 1002 provides various wireless services including telephony, video, data, messaging, broadcasts, and/or other services. The UTRAN 1002 may include a plurality of Radio Network Subsystems (RNSs) such as an RNS 1007, each controlled by a respective Radio Network Controller (RNC) such as an RNC 1006. Here, the UTRAN 1002 may include any number of RNCs 1006 and RNSs 1007 in addition to the RNCs 1006 and RNSs 1007 illustrated herein. The RNC 1006 is an apparatus responsible for, among other things, assigning, reconfiguring and releasing radio resources within the RNS 1007. The RNC 1006 may be interconnected to other RNCs (not shown) in the UTRAN 1002 through various types of interfaces such as a direct physical connection, a virtual network, or the like, using any suitable transport network.

Communication between a UE 1010 and a Node B 1008 may be considered as including a physical (PHY) layer and a medium access control (MAC) layer. Further, communication between a UE 1010 and an RNC 1006 by way of a respective Node B 1008 may be considered as including a radio resource control (RRC) layer. In the instant specification, the PHY layer may be considered layer 1; the MAC layer may be considered layer 2; and the RRC layer may be considered layer 3. Information hereinbelow utilizes terminology introduced in the RRC Protocol Specification, 3GPP TS 25.331 v9.1.0, incorporated herein by reference.

The geographic region covered by the RNS 1007 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 1008 are shown in each RNS 1007; however, the RNSs 1007 may include any number of wireless Node Bs. The Node Bs 1008 provide wireless access points to a CN 1004 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as a UE in UMTS applications, but may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. In a UMTS system, the UE 1010 may further include a universal subscriber identity module (USIM) 1011, which contains a user's subscription information to a network. For illustrative purposes, one UE 1010 is shown in communication with a number of the Node Bs 1008. The DL, also called the forward link, refers to the communication link from a Node B 1008 to a UE 1010, and the UL, also called the reverse link, refers to the communication link from a UE 1010 to a Node B 1008.

The CN 1004 interfaces with one or more access networks, such as the UTRAN 1002. As shown, the CN 1004 is a GSM core network. However, as those skilled in the art will recognize, the various concepts presented throughout this disclosure may be implemented in a RAN, or other suitable access network, to provide UEs with access to types of CNs other than GSM networks.

The CN 1004 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the CN 1004 supports circuit-switched services with a MSC 1012 and a GMSC 1014. In some applications, the GMSC 1014 may be referred to as a media gateway (MGW). One or more RNCs, such as the RNC 1006, may be connected to the MSC 1012. The MSC 1012 is an apparatus that controls call setup, call routing, and UE mobility functions. The MSC 1012 also includes a VLR that contains subscriber-related information for the duration that a UE is in the coverage area of the MSC 1012. The GMSC 1014 provides a gateway through the MSC 1012 for the UE to access a circuit-switched network 1016. The GMSC 1014 includes a home location register (HLR) 1015 containing subscriber data, such as the data reflecting the details of the services to which a particular user has subscribed. The HLR is also associated with an authentication center (AuC) that contains subscriber-specific authentication data. When a call is received for a particular UE, the GMSC 1014 queries the HLR 1015 to determine the UE's location and forwards the call to the particular MSC serving that location.

The CN 1004 also supports packet-data services with a serving GPRS support node (SGSN) 1018 and a gateway GPRS support node (GGSN) 1020. GPRS, which stands for General Packet Radio Service, is designed to provide packet-data services at speeds higher than those available with standard circuit-switched data services. The GGSN 1020 provides a connection for the UTRAN 1002 to a packet-based network 1022. The packet-based network 1022 may be the Internet, a private data network, or some other suitable packet-based network. The primary function of the GGSN 1020 is to provide the UEs 1010 with packet-based network connectivity. Data packets may be transferred between the GGSN 1020 and the UEs 1010 through the SGSN 1018, which performs primarily the same functions in the packet-based domain as the MSC 1012 performs in the circuit-switched domain.

An air interface for UMTS may utilize a spread spectrum Direct-Sequence Code Division Multiple Access (DS-CDMA) system. The spread spectrum DS-CDMA spreads user data through multiplication by a sequence of pseudorandom bits called chips. The "wideband" W-CDMA air interface for UMTS is based on such direct sequence spread spectrum technology and additionally calls for a frequency division duplexing (FDD). FDD uses a different carrier frequency for the UL and DL between a Node B 1008 and a UE 1010. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles may be equally applicable to a TD-SCDMA air interface.

An HSPA air interface includes a series of enhancements to the 3G/W-CDMA air interface, facilitating greater throughput and reduced latency. Among other modifications over prior releases, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink, or EUL).

HSDPA utilizes as its transport channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH).

Among these physical channels, the HS-DPCCH carries the HARQ ACK/NACK signaling on the uplink to indicate whether a corresponding packet transmission was decoded successfully. That is, with respect to the downlink, the UE 1010 provides feedback to the node B 1008 over the HS-DPCCH to indicate whether it correctly decoded a packet on the downlink.

HS-DPCCH further includes feedback signaling from the UE 1010 to assist the node B 1008 in taking the right decision in terms of modulation and coding scheme and precoding weight selection, this feedback signaling including the CQI and PCI.

"HSPA Evolved" or HSPA+ is an evolution of the HSPA standard that includes MIMO and 64-QAM, enabling increased throughput and higher performance. That is, in an aspect of the disclosure, the node B 1008 and/or the UE 1010 may have multiple antennas supporting MIMO technology. The use of MIMO technology enables the node B 1008 to exploit the spatial domain to support spatial multiplexing, beamforming, and transmit diversity.

Multiple Input Multiple Output (MIMO) is a term generally used to refer to multi-antenna technology, that is, multiple transmit antennas (multiple inputs to the channel) and multiple receive antennas (multiple outputs from the channel). MIMO systems generally enhance data transmission performance, enabling diversity gains to reduce multipath fading and increase transmission quality, and spatial multiplexing gains to increase data throughput.

Spatial multiplexing may be used to transmit different streams of data simultaneously on the same frequency. The data steams may be transmitted to a single UE 1010 to increase the data rate or to multiple UEs 1010 to increase the overall system capacity. This is achieved by spatially precoding each data stream and then transmitting each spatially precoded stream through a different transmit antenna on the downlink. The spatially precoded data streams arrive at the UE(s) 1010 with different spatial signatures, which enables each of the UE(s) 1010 to recover the one or more the data streams destined for that UE 1010. On the uplink, each UE 1010 may transmit one or more spatially precoded data streams, which enables the node B 1008 to identify the source of each spatially precoded data stream.

Spatial multiplexing may be used when channel conditions are good. When channel conditions are less favorable, beamforming may be used to focus the transmission energy in one or more directions, or to improve transmission based on characteristics of the channel. This may be achieved by spatially precoding a data stream for transmission through multiple antennas. To achieve good coverage at the edges of the cell, a single stream beamforming transmission may be used in combination with transmit diversity.

Generally, for MIMO systems utilizing n transmit antennas, n transport blocks may be transmitted simultaneously over the same carrier utilizing the same channelization code. Note that the different transport blocks sent over the n transmit antennas may have the same or different modulation and coding schemes from one another.

On the other hand, Single Input Multiple Output (SIMO) generally refers to a system utilizing a single transmit antenna (a single input to the channel) and multiple receive antennas (multiple outputs from the channel). Thus, in a SIMO system, a single transport block is sent over the respective carrier.

Figure 11:
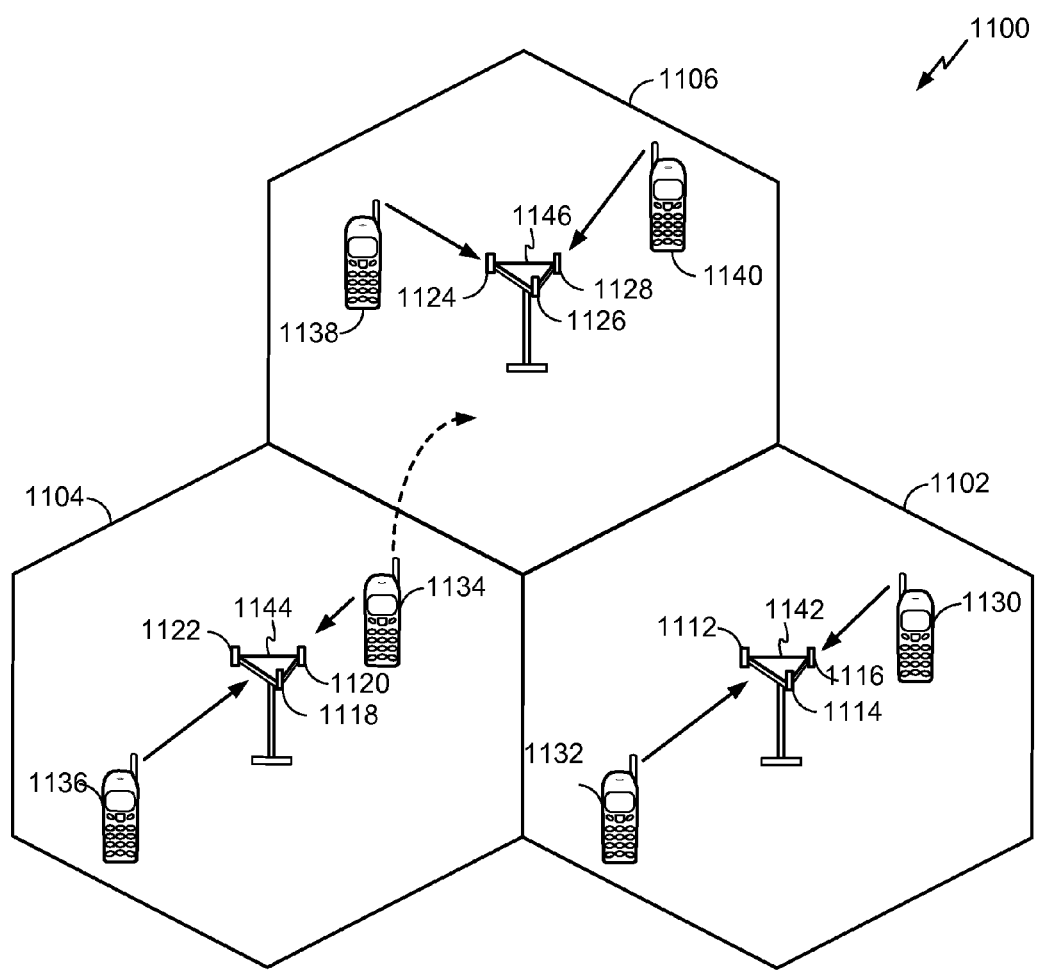
FIG. 11 is a conceptual diagram illustrating an example of an access network.

Referring to FIG. 11, an access network 1100 in a UTRAN architecture is illustrated. The multiple access wireless communication system includes multiple cellular regions (cells), including cells 1102, 1104, and 1106, each of which may include one or more sectors. The multiple sectors can be formed by groups of antennas with each antenna responsible for communication with UEs in a portion of the cell. For example, in cell 1102, antenna groups 1112, 1114, and 1116 may each correspond to a different sector. In cell 1104, antenna groups 1118, 1120, and 1122 each correspond to a different sector. In cell 1106, antenna groups 1124, 1126, and 1128 each correspond to a different sector. The cells 1102, 1104 and 1106 may include several wireless communication devices, e.g., User Equipment or UEs, which may be in communication with one or more sectors of each cell 1102, 1104 or 1106. For example, UEs 1130 and 1132 may be in communication with Node B 1142, UEs 1134 and 1136 may be in communication with Node B 1144, and UEs 1138 and 1140 can be in communication with Node B 1146. Here, each Node B 1142, 1144, 1146 is configured to provide an access point to a CN 1004 (see FIG. 10) for all the UEs 1130, 1132, 1134, 1136, 1138, 1140 in the respective cells 1102, 1104, and 1106.

As the UE 1134 moves from the illustrated location in cell 1104 into cell 1106, a serving cell change (SCC) or handover may occur in which communication with the UE 1134 transitions from the cell 1104, which may be referred to as the source cell, to cell 1106, which may be referred to as the target cell. Management of the handover procedure may take place at the UE 1134, at the Node Bs corresponding to the respective cells, at a radio network controller 1006 (see FIG. 10), or at another suitable node in the wireless network. For example, during a call with the source cell 1104, or at any other time, the UE 1134 may monitor various parameters of the source cell 1104 as well as various parameters of neighboring cells such as cells 1106 and 1102. Further, depending on the quality of these parameters, the UE 1134 may maintain communication with one or more of the neighboring cells. During this time, the UE 1134 may maintain an Active Set, that is, a list of cells that the UE 1134 is simultaneously connected to (i.e., the UTRA cells that are currently assigning a downlink dedicated physical channel DPCH or fractional downlink dedicated physical channel F-DPCH to the UE 1134 may constitute the Active Set).

The modulation and multiple access scheme employed by the access network 1100 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE, LTE Advanced, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The radio protocol architecture may take on various forms depending on the particular application. An example for an HSPA system will now be presented with reference to FIG. 12.

Figure 12:
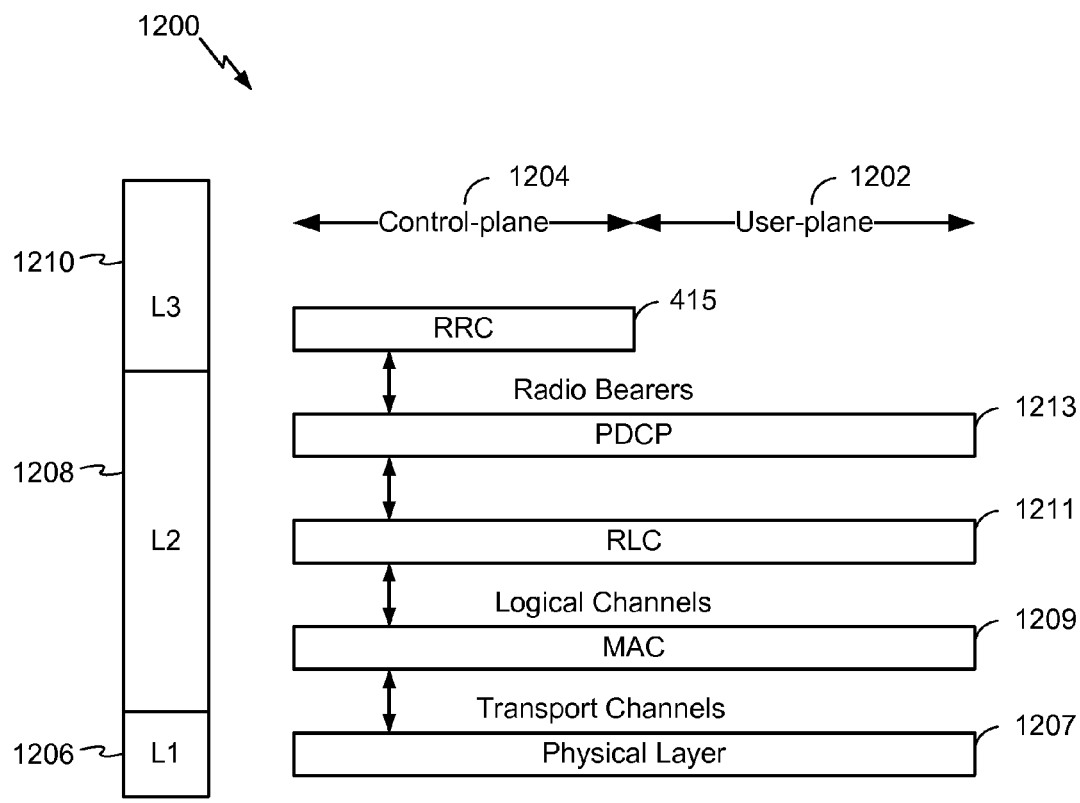
FIG. 12 is a conceptual diagram illustrating an example of a radio protocol architecture for the user and control plane.

Referring to FIG. 12, an example radio protocol architecture 1200 relates to the user plane 402 and the control plane 1204 of a user equipment (UE) or node B/base station. For example, architecture 1200 may be included in a UE such as mobile station 120 (FIG. 1). The radio protocol architecture 1200 for the UE and node B is shown with three layers: Layer 1 1206, Layer 2 1208, and Layer 3 1210. Layer 1 1206 is the lowest lower and implements various physical layer signal processing functions. As such, Layer 1 1206 includes the physical layer 1207. Layer 2 (L2 layer) 1208 is above the physical layer 1207 and is responsible for the link between the UE and node B over the physical layer 1207. Layer 3 (L3 layer) 1210 includes a radio resource control (RRC) sublayer 1215. The RRC sublayer 1215 handles the control plane signaling of Layer 3 between the UE and the UTRAN.

In the user plane, the L2 layer 1208 includes a media access control (MAC) sublayer 1209, a radio link control (RLC) sublayer 1211, and a packet data convergence protocol (PDCP) 1213 sublayer, which are terminated at the node B on the network side. Although not shown, the UE may have several upper layers above the L2 layer 1208 including a network layer (e.g., IP layer) that is terminated at a PDN gateway on the network side, and an application layer that is terminated at the other end of the connection (e.g., far end UE, server, etc.).

The PDCP sublayer 1213 provides multiplexing between different radio bearers and logical channels. The PDCP sublayer 1213 also provides header compression for upper layer data packets to reduce radio transmission overhead, security by ciphering the data packets, and handover support for UEs between node Bs. The RLC sublayer 1211 provides segmentation and reassembly of upper layer data packets, retransmission of lost data packets, and reordering of data packets to compensate for out-of-order reception due to hybrid automatic repeat request (HARQ). The MAC sublayer 1209 provides multiplexing between logical and transport channels. The MAC sublayer 1209 is also responsible for allocating the various radio resources (e.g., resource blocks) in one cell among the UEs. The MAC sublayer 1209 is also responsible for HARQ operations.

Figure 13:
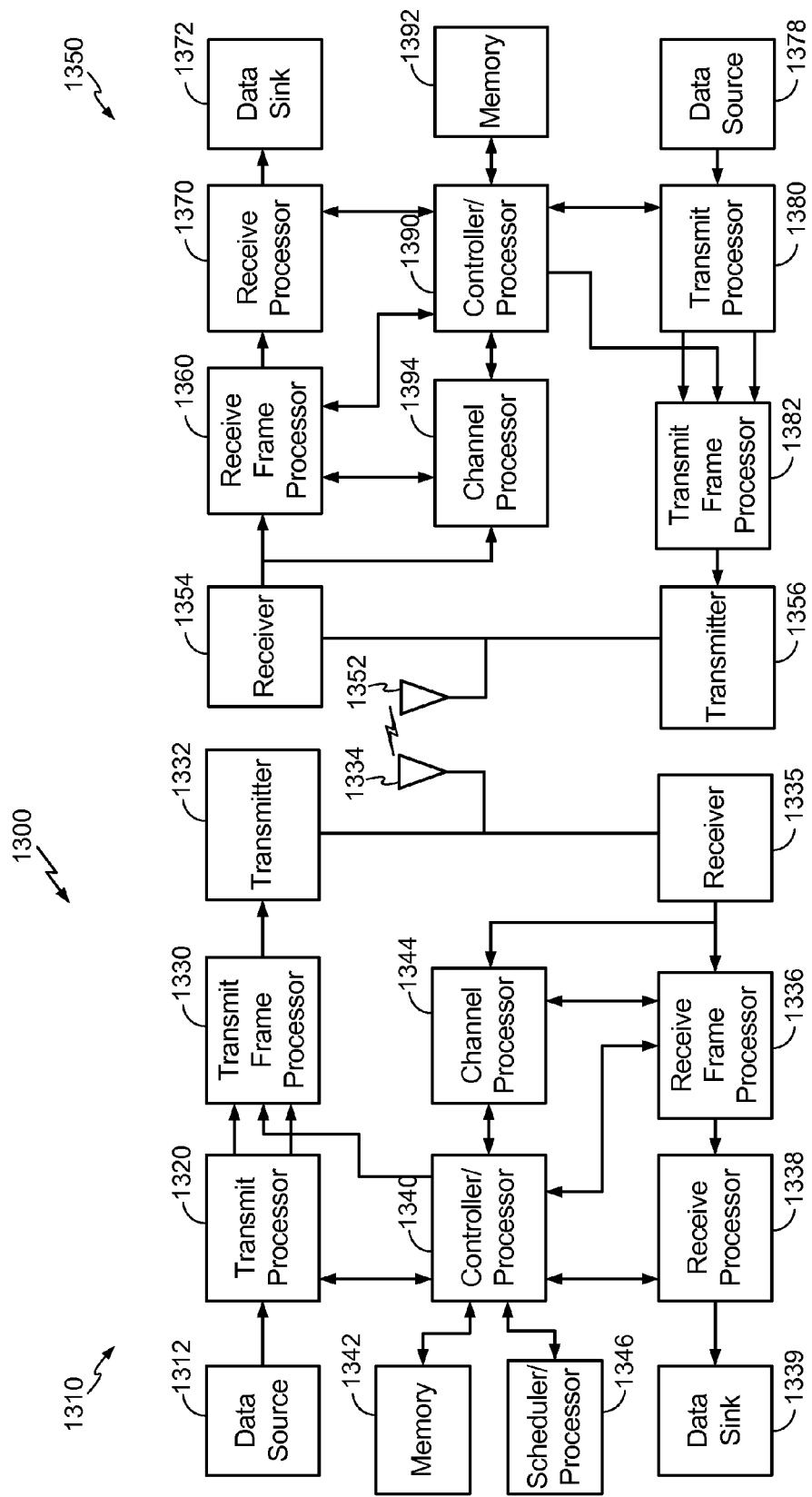
FIG. 13 is a block diagram conceptually illustrating an example of a Node B in communication with a UE in a telecommunications system.

FIG. 13 is a block diagram of a Node B 1310 in communication with a UE 1350. In the downlink communication, a transmit processor 1320 may receive data from a data source 1312 and control signals from a controller/processor 1340. The transmit processor 1320 provides various signal processing functions for the data and control signals, as well as reference signals (e.g., pilot signals). For example, the transmit processor 1320 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 1344 may be used by a controller/processor 1340 to determine the coding, modulation, spreading, and/or scrambling schemes for the transmit processor 1320. These channel estimates may be derived from a reference signal transmitted by the UE 1350 or from feedback from the UE 1350. The symbols generated by the transmit processor 1320 are provided to a transmit frame processor 1330 to create a frame structure. The transmit frame processor 1330 creates this frame structure by multiplexing the symbols with information from the controller/processor 1340, resulting in a series of frames. The frames are then provided to a transmitter 1332, which provides various signal conditioning functions including amplifying, filtering, and modulating the frames onto a carrier for downlink transmission over the wireless medium through antenna 1334. The antenna 1334 may include one or more antennas, for example, including beam steering bidirectional adaptive antenna arrays or other similar beam technologies.

At the UE 1350, a receiver 1354 receives the downlink transmission through an antenna 1352 and processes the transmission to recover the information modulated onto the carrier. The information recovered by the receiver 1354 is provided to a receive frame processor 1360, which parses each frame, and provides information from the frames to a channel processor 1394 and the data, control, and reference signals to a receive processor 1370. The receive processor 1370 then performs the inverse of the processing performed by the transmit processor 1320 in the Node B 1310. More specifically, the receive processor 1370 descrambles and despreads the symbols, and then determines the most likely signal constellation points transmitted by the Node B 1310 based on the modulation scheme. These soft decisions may be based on channel estimates computed by the channel processor 1394. The soft decisions are then decoded and deinterleaved to recover the data, control, and reference signals. The CRC codes are then checked to determine whether the frames were successfully decoded. The data carried by the successfully decoded frames will then be provided to a data sink 1372, which represents applications running in the UE 1350 and/or various user interfaces (e.g., display). Control signals carried by successfully decoded frames will be provided to a controller/processor 1390. When frames are unsuccessfully decoded by the receiver processor 1370, the controller/processor 1390 may also use an acknowledgement (ACK) and/or negative acknowledgement (NACK) protocol to support retransmission requests for those frames.

In the uplink, data from a data source 1378 and control signals from the controller/processor 1390 are provided to a transmit processor 1380. The data source 1378 may represent applications running in the UE 1350 and various user interfaces (e.g., keyboard). Similar to the functionality described in connection with the downlink transmission by the Node B 1310, the transmit processor 1380 provides various signal processing functions including CRC codes, coding and interleaving to facilitate FEC, mapping to signal constellations, spreading with OVSFs, and scrambling to produce a series of symbols. Channel estimates, derived by the channel processor 1394 from a reference signal transmitted by the Node B 1310 or from feedback contained in the midamble transmitted by the Node B 1310, may be used to select the appropriate coding, modulation, spreading, and/or scrambling schemes. The symbols produced by the transmit processor 1380 will be provided to a transmit frame processor 1382 to create a frame structure. The transmit frame processor 1382 creates this frame structure by multiplexing the symbols with information from the controller/processor 1390, resulting in a series of frames. The frames are then provided to a transmitter 1356, which provides various signal conditioning functions including amplification, filtering, and modulating the frames onto a carrier for uplink transmission over the wireless medium through the antenna 1352.

The uplink transmission is processed at the Node B 1310 in a manner similar to that described in connection with the receiver function at the UE 1350. A receiver 1335 receives the uplink transmission through the antenna 1334 and processes the transmission to recover the information modulated onto the carrier. The information recovered by the receiver 1335 is provided to a receive frame processor 1336, which parses each frame, and provides information from the frames to the channel processor 1344 and the data, control, and reference signals to a receive processor 1338. The receive processor 1338 performs the inverse of the processing performed by the transmit processor 1380 in the UE 1350. The data and control signals carried by the successfully decoded frames may then be provided to a data sink 1339 and the controller/processor, respectively. If some of the frames were unsuccessfully decoded by the receive processor, the controller/processor 1340 may also use an acknowledgement (ACK) and/or negative acknowledgement (NACK) protocol to support retransmission requests for those frames.

The controller/processors 1340 and 1390 may be used to direct the operation at the Node B 1310 and the UE 1350, respectively. For example, the controller/processors 1340 and 1390 may provide various functions including timing, peripheral interfaces, voltage regulation, power management, and other control functions. The computer readable media of memories 1342 and 1392 may store data and software for the Node B 1310 and the UE 1350, respectively. A scheduler/processor 1346 at the Node B 1310 may be used to allocate resources to the UEs and schedule downlink and/or uplink transmissions for the UEs.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication, comprising: determining a channel condition associated with each of a first carrier of a first base station and a second carrier of the first base station; assigning the first carrier to a first antenna element configuration; assigning the second carrier to a second antenna element configuration, the first antenna element configuration and the second antenna element configuration providing different coverage areas; transmitting, via the first carrier, a first portion of a data stream; and simultaneously transmitting, via the second carrier, a second portion of the data stream, wherein an amount of data in the first portion of the data stream and an amount of data in the second portion of the data stream is determined based on the determined channel conditions;
   wherein the first antenna element configuration has a different gain pattern than the second antenna element configuration; and
   wherein the first antenna element configuration points a bore sight in a first direction and the second antenna element configuration points the bore sight in a second direction.

2. The method of claim 1, wherein the first antenna element configuration and the second antenna element configuration use at least some of the same antenna elements.

3. The method of claim 1, further comprising:
   assigning the first carrier on a second base station to a third antenna element configuration; and
   assigning the second carrier on the second base station to a fourth antenna element configuration,
   wherein the third antenna element configuration is different than the fourth antenna element configuration.

4. The method of claim 3, wherein the first antenna element configuration and the fourth antenna element configuration comprise high gain antennas, and the second antenna element configuration and the third antenna element configuration comprise low gain antennas.

5. The method of claim 3, wherein the first base station is a macro base station and the second base station is a pico base station.

6. The method of claim 3, wherein both the first base station and the second base station are macro base stations.

7. The method of claim 1, wherein the first base station comprises a modular antenna comprising a plurality of antenna modules, wherein assigning the first carrier to the first antenna element configuration comprises assigning the first carrier to a first subset of the plurality of antenna modules and assigning the second carrier to a second subset of the plurality of antenna modules.

8. An apparatus for wireless communication, comprising: means for determining a channel condition associated with each of a first carrier of a base station and a second carrier of the base station; means for assigning the first carrier to a first antenna element configuration; means for assigning the second carrier to a second antenna element configuration, the first antenna element configuration and the second antenna element configuration providing different coverage areas; means for transmitting, via the first carrier, a first portion of a data stream; and means for simultaneously transmitting, via the second carrier, a second portion of the data stream, wherein an amount of data in the first portion of the data stream and an amount of data in the second portion of the data stream is determined based on the determined channel conditions;
   wherein the first antenna element configuration has a different gain pattern than the second antenna element configuration; and
   wherein the first antenna element configuration points a bore sight in a first direction and the second antenna element configuration points the bore sight in a second direction.

9. A computer program product, comprising: a non-transitory computer-readable medium comprising code for: determining a channel condition associated with each of a first carrier of a base station and a second carrier of the base station; assigning the first carrier to a first antenna element configuration; assigning the second carrier to a second antenna element configuration, the first antenna element configuration and the second antenna element configuration providing different coverage areas; transmitting, via the first carrier, a first portion of a data stream; and simultaneously transmitting, via the second carrier, a second portion of the data stream, wherein an amount of data in the first portion of the data stream and an amount of data in the second portion of the data stream is determined based on the determined channel conditions;
   wherein the first antenna element configuration has a different gain pattern than the second antenna element configuration; and
wherein the first antenna element configuration points a bore sight in a first direction and the second antenna element configuration points the bore sight in a second direction.

10. An apparatus for wireless communication, comprising: at least one processor; and a memory coupled to the at least one processor, wherein the at least one processor is configured to: determine a channel condition associated with each of a first carrier of a first base station and a second carrier of the first base station; assign the first carrier to a first antenna element configuration; assign the second carrier to a second antenna element configuration, the first antenna element configuration and the second antenna element configuration providing different coverage areas; transmit, via the first carrier, a first portion of a data stream; and simultaneously transmit, via the second carrier, a second portion of the data stream, wherein an amount of data in the first portion of the data stream and an amount of data in the second portion of the data stream is determined based on the determined channel conditions;
   wherein the first antenna element configuration has a different gain pattern than the second antenna element configuration; and
   wherein the first antenna element configuration points a bore sight in a first direction and the second antenna element configuration points the bore sight in a second direction.

11. The apparatus of claim 10, wherein the first antenna element configuration and the second antenna element configuration use at least some of the same antenna elements.

12. The apparatus of claim 10, wherein the at least one processor is further configured to:

assign to the first carrier on a second base station a third antenna element configuration; and assign to the second carrier on the second base station a fourth antenna element configuration, wherein the third antenna element configuration is different than the fourth antenna element configuration.

13. The apparatus of claim 12, wherein the first antenna element configuration and the fourth antenna element configuration comprise high gain antennas, and the second antenna element configuration and the third antenna element configuration comprise low gain antennas.

14. The apparatus of claim 12, wherein the first base station is a macro base station and the second base station is a pico base station.

15. The apparatus of claim 12, wherein both the first base station and the second base station are macro base stations.

16. The apparatus of claim 10, wherein the first base station comprises a modular antenna comprising a plurality of antenna modules, wherein the at least one processor is configured to assign the first carrier to a first subset of the plurality of antenna modules and assign the second carrier to a second subset of the plurality of antenna modules.

* * * * *